(12) United States Patent
Cho et al.

(10) Patent No.: US 9,537,670 B2
(45) Date of Patent: Jan. 3, 2017

(54) ENVIRONMENT MONITORING METHOD AND APPARATUS THEREFOR

(71) Applicant: CENTER FOR INTEGRATED SMART SENSORS FOUNDATION, Daejeon (KR)

(72) Inventors: Hyun Tae Cho, Daejeon (KR); Chong Min Kyung, Daejeon (KR)

(73) Assignee: CENTER FOR INTEGRATED SMART SENSORS FOUNDATION (KR)

(*) Notice: Subject to any disclaimer, the term of this patent is extended or adjusted under 35 U.S.C. 154(b) by 26 days.

(21) Appl. No.: 14/676,994

(22) Filed: Apr. 2, 2015

(65) Prior Publication Data

US 2016/0042630 A1 Feb. 11, 2016

(30) Foreign Application Priority Data

Apr. 4, 2014 (KR) ........................ 10-2014-0040361

(51) Int. Cl.
*G08B 19/00* (2006.01)
*H04L 12/28* (2006.01)
*G08B 21/18* (2006.01)
*H02J 7/00* (2006.01)

(52) U.S. Cl.
CPC .......... *H04L 12/2825* (2013.01); *G08B 19/00* (2013.01); *G08B 21/18* (2013.01); *G08B 21/182* (2013.01); *H04L 12/2827* (2013.01); *H02J 7/0047* (2013.01); *H02J 2007/0098* (2013.01)

(58) Field of Classification Search
CPC ........ G08B 21/18; G08B 21/182; G08B 19/00
See application file for complete search history.

(56) References Cited

U.S. PATENT DOCUMENTS

| 6,023,223 A * | 2/2000 | Baxter, Jr. | ............. G06Q 10/06 340/3.4 |
| 6,873,256 B2 * | 3/2005 | Lemelson | ............. G08B 7/066 340/511 |
| 6,919,803 B2 * | 7/2005 | Breed | .................. G06Q 20/203 340/426.19 |

(Continued)

FOREIGN PATENT DOCUMENTS

| KR | 1019990023689 | 3/1999 |
| KR | 10-2012-0100183 | 3/2001 |
| KR | 10-2001-0017326 | 9/2012 |

*Primary Examiner* — Andrew Bee
(74) *Attorney, Agent, or Firm* — Blank Rome LLP

(57) ABSTRACT

An environment monitoring method and an apparatus therefor are provided. The environment monitoring apparatus includes a charging unit configured to charge power necessary for monitoring environments, a sensing unit configured to receive the power from the charging unit and to sense peripheral environments through a plurality of different sensors which are selected according to a request of a user, a controller configured to control settings of the sensing unit according to the peripheral environments; a communication unit configured to transmit the sensed information of the sensing unit to a server so that the server shares the sensed information with a plurality of smart devices, and a display unit configured to display the sensed information to the user and to display a notification according to the sensed information to the user.

16 Claims, 5 Drawing Sheets

(56) References Cited

U.S. PATENT DOCUMENTS

| | | | |
|---|---|---|---|
| 7,394,363 B1* | 7/2008 | Ghahramani | G06Q 10/08 340/521 |
| 7,916,015 B1* | 3/2011 | Evancich | G08B 21/12 340/521 |
| 8,521,453 B1* | 8/2013 | Silverman | G01N 29/043 702/171 |
| 8,952,809 B2* | 2/2015 | Kreiner | H04M 1/72569 340/539.27 |
| 2005/0024208 A1* | 2/2005 | Maki | G08B 13/2497 340/545.3 |
| 2005/0046567 A1* | 3/2005 | Mortenson | G06Q 10/047 340/539.13 |
| 2010/0170325 A1* | 7/2010 | Ren | G01N 27/127 73/31.05 |
| 2011/0216626 A1* | 9/2011 | Stacey | H04B 11/00 367/131 |
| 2012/0286951 A1* | 11/2012 | Hess | G08B 25/008 340/539.1 |
| 2012/0327831 A1* | 12/2012 | Arendas | H04W 52/0216 370/311 |
| 2013/0039481 A1* | 2/2013 | Garaschenko | H04M 3/24 379/102.04 |
| 2013/0188460 A1* | 7/2013 | Ihashi | G04B 99/00 368/66 |
| 2014/0281479 A1* | 9/2014 | Gettings | G01N 33/0062 713/150 |
| 2015/0010438 A1* | 1/2015 | Heng | G01N 33/0075 422/98 |
| 2015/0237310 A1* | 8/2015 | Lo | H04N 7/181 348/153 |

* cited by examiner

ENVIRONMENT MONITORING METHOD AND APPARATUS THEREFOR

CROSS-REFERENCE TO RELATED APPLICATIONS

A claim for priority under 35 U.S.C. §119 is made to Korean Patent Application No. 10-2014-0040361 filed Apr. 4, 2014, in the Korean Intellectual Property Office, the entire contents of which are hereby incorporated by reference.

BACKGROUND

Embodiments of the inventive concepts described herein relate to a personal/household environment monitoring method which may be used by persons and an apparatus therefor.

A current method of acquiring data using sensors is a method of installing sensors for acquiring desired data in many places. There is a problem in that technology which may integrate and control sensors and may communicate with the sensors does not become commercialized. Accordingly, ubiquitous network technology becomes attractive to solve the problem. The ubiquitous network technology means technology which may naturally connect to a variety of networks anytime or anywhere.

However, technology for grafting the ubiquitous network technology onto office environments is not actively developed.

Therefore, it is needed to provide a system which may operate without the difficulty of maintenance by collecting current office environmental statuses of facilities in real time and providing a proper measure to a remote place as well as a field at a proper time in real time.

SUMMARY

Embodiments of the inventive concepts provide an environment monitoring apparatus for measuring temperature, humidity, fine dust, ultraviolet (UV) indexes, harmful environment concentration in the atmosphere and the like and transmitting the measured information to users through a wireless network.

Embodiments of the inventive concepts provide an environment monitoring method of receiving power from the light of the sun, measuring atmospheric environments continuously or frequently, and transmitting the measured information in real time in the daytime when a user wakes up and moves, and maintaining low-power while intermittently measuring atmospheric environments in the night time when the user takes sleep and an apparatus therefor.

One aspect of embodiments of the inventive concept is directed to provide an environment monitoring apparatus. The environment monitoring apparatus may include a charging unit configured to charge power necessary for monitoring environments, a sensing unit configured to receive the power from the charging unit and to sense peripheral environments through a plurality of different sensors which are selected according to a request of a user, a controller configured to control settings of the sensing unit according to the peripheral environments, a communication unit configured to transmit the sensed information of the sensing unit to a server so that the server shares the sensed information with a plurality of smart devices, and a display unit configured to display the sensed information to the user and to display a notification according to the sensed information to the user.

The charging unit may include an illumination sensor configured to adjust a charging mode according to day and night and the charging unit may generate and store power from the light of the sun during the day using the illumination sensor and may operate in a low-power mode at night using the stored power.

The plurality of different sensors may include an ozone concentration sensor, a fine dust sensor, a carbon monoxide sensor, a volatile organic compounds (VOC) sensor, an air pollution sensor, a radioactivity sensor, a ultraviolet (UV) index sensor, a camera, and a microphone.

The controller may configure the plurality of different sensors as predetermined sets and may select the sets automatically or manually according to a request of the user.

The controller may differently control duty cycles of the sensors.

The controller may differently control report periods of the sensors according to the peripheral environments or a request of the user.

The controller may select sensors to be activated among the sensors using time information and may control the sensors so that the sensors operate in a predetermined time according to a request of the user using the time information.

The communication unit may perform time synchronization through a wireless-fidelity (Wi-Fi) access point (AP) or a plurality of smart devices when transmitting the sensed information through a network.

The controller may control sensing settings of the sensing unit according to the synchronized time.

The controller may separately turn on/off the sensors according to current power and charging states or may select a set of the sensors as a set for low-power consumption.

Another aspect of embodiments of the inventive concept is directed to provide an environment monitoring system. The environment monitoring system may include an environment monitoring apparatus configured to sense peripheral environments and to transmit the sensed information to a server, a server configured to receive and store the sensed information from the environment monitoring apparatus and to share the sensed information through a wireless router and the Internet, and a plurality of smart devices, each of the smart devices configured to receive the sensed information from the server or the environment monitoring apparatus and to display a notification on the sensed information to the user.

Each of the smart devices may automatically display the notification on the sensed information to the user through an application previously installed in each of the smart devices when each of the smart devices enters an area of a Wi-Fi AP.

Each of the smart devices may connect to the server which shares the sensed information with each of the smart devices through the wireless router and the Internet, and may share the sensed information with the server.

Another aspect of embodiments of the inventive concept is directed to provide an environment monitoring method. The environment monitoring method may include charging power necessary for monitoring environments, receiving the charged power and sensing peripheral environments through a sensing unit including a plurality of different sensors which are selected according to a request of a user, controlling settings of the sensing unit according to the peripheral environments, transmitting the sensed information of the sensing unit to a server so that the server shares the sensed information with a plurality of smart devices through a wireless router, and displaying the sensed information to the user and displaying a notification according to the sensed information to the user.

The controlling of the settings of the sensing unit according to the peripheral environments may include configuring the plurality of different sensors as predetermined sets and selecting the sets automatically or manually according to a request of the user.

The controlling of the settings of the sensing unit according to the peripheral environments may include differently controlling report periods of the sensors according to the peripheral environments or a request of the user.

The controlling of the settings of the sensing unit according to the peripheral environments may include separately turning on/off the sensors according to current power and charging states or selecting a set of the sensors as a set for low-power consumption.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
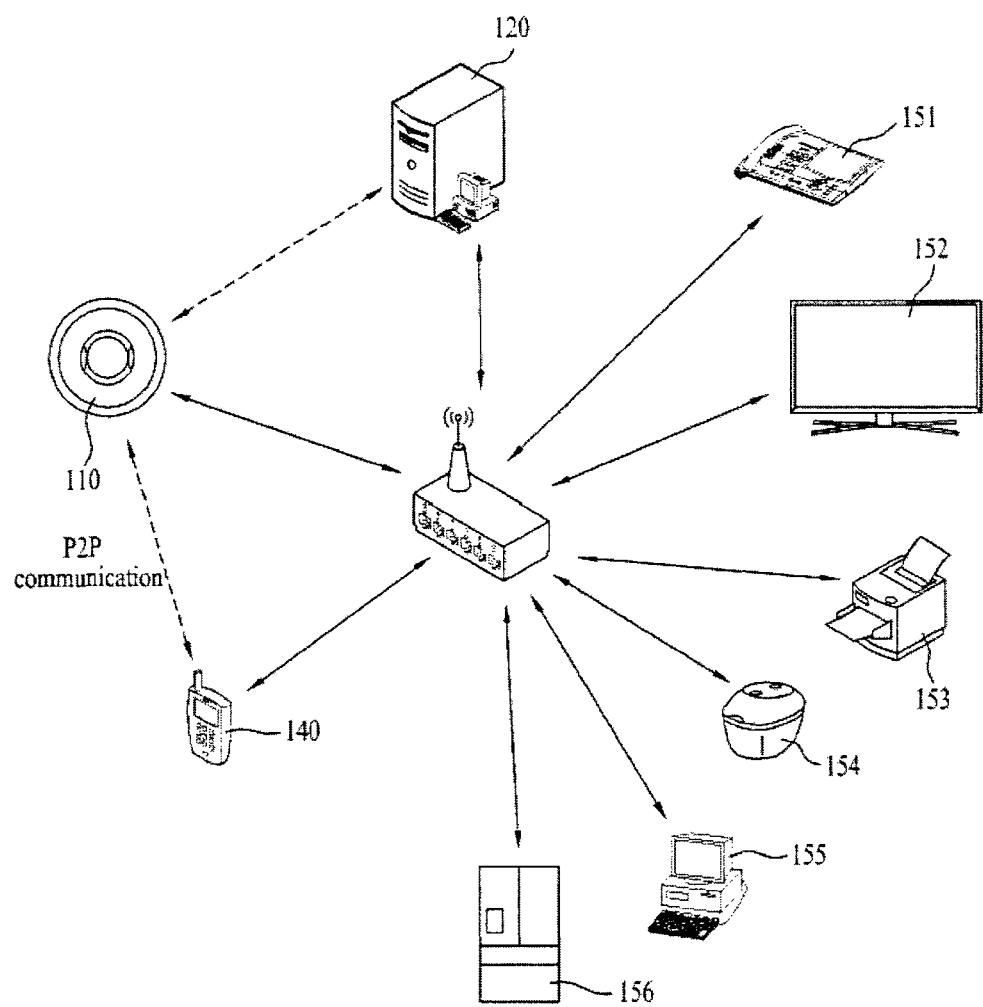
FIG. 1 is a drawing illustrating the entire configuration of an environment monitoring system according to an exemplary embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Hereinafter, a description will be given in detail for exemplary embodiments of the inventive concept with reference to the accompanying drawings.

FIG. 1 is a drawing illustrating the entire configuration of an environment monitoring system according to an exemplary embodiment of the inventive concept. The environment monitoring system may include an environment monitoring apparatus 110, a server 120, and smart devices 140 and 151 to 156.

The environment monitoring apparatus 110 may acquire an environmental pollution level and information about environments near a user or his or her house. The environment monitoring apparatus 110 may include a plurality of different sensors which may sense environments and a charging unit for performing a low-power operation and the like. For example, the environment monitoring apparatus 110 may receive power from the light of the sun, may sense atmospheric environments continuously or frequently, and may transmit the sensed information in real time in the daytime when a user wakes up and moves. On the other hand, the environment monitoring apparatus 110 may maintain low-power while intermittently measuring atmospheric environments in the night time when the user takes sleep. A description will be given in detail for an internal configuration of the environment monitoring apparatus 110 with reference to FIG. 2.

For example, this environment monitoring apparatus 110 may be attached to a certain place using a sticker or may be fixed to an opposite glass using a magnet when it is fixed to a glass. Therefore, the environment monitoring apparatus 110 may monitor indoor environments through its camera and sensors.

The environment monitoring apparatus 110 may sense peripheral environments and may transmit the sensed information to the server 120. The server 120 may receive and store the sensed information from the environment monitoring apparatus 110 and may share the sensed information with the plurality of smart devices 140 and 151 to 156 through a wireless router (e.g., a wireless-fidelity (Wi-Fi) access point (AP) 130). Each of the plurality of smart devices 140 and 151 to 156 may receive the sensed information from the server 120 through the Wi-Fi AP 130 and may display notification on the sensed information to a user. Also, if each of the plurality of smart devices 140 and 151 to 156 enters an area of the Wi-Fi AP 130, it may automatically display the notification on the sensed information to the user through an application previously installed therein. The plurality of smart devices 140 and 151 to 156 may include the smart phone 140, the interphone 151, the smart television (TV) 152, the printer 153, the smart rice cooker 154, the personal computer (PC) 155, and the smart refrigerator 156. In other words, recently, a home network has been used in many households. Accordingly, household appliances may transmit data to other household appliances (e.g., a TV, an audio, and a PC) using home networking. These household appliances or the plurality of smart devices may receive and display data from the server 120 if necessary. Also, the server 120 or the environment monitoring apparatus 110 may display a notification on sensed information on each of the smart devices of the user through its push function.

The environment monitoring apparatus 110 may directly connect with the plurality of smart devices 140 and 151 to 156 or the server 120 and may connect with the plurality of smart devices 140 and 151 to 156, the server 120, the Internet, and other electronic devices through the Wi-Fi AP 130. Recently, technology which may perform this may be a digital living network appliance (DLNA) protocol. The DLNA protocol may be technology for sharing data in home network environments by Wi-Fi technology.

The server 120 may be a DLNA server in home and may be a server connected to the Internet. Also, the server 120 may be at least one of electronic devices. A Wi-Fi AP which is recently released to the market may include a server function for itself. In other words, the Wi-Fi AP may connect electronic devices which are always turned on among electronic devices with the Internet in home. Accordingly, the Wi-Fi AP may play a role as a server without a separate server.

The entire operation of the environment monitoring system is as follows. If an operation of the environment monitoring apparatus 110 is started, the environment monitoring apparatus 110 may read status information, such as the remaining capacity of its battery and time information, and environment settings. The environment monitoring apparatus 110 may connect to a network and checks whether there is a change in environment settings. When there is the change in the environment settings, the environment monitoring apparatus 110 may update its environment settings. For example, the environment settings may include a data transmission period, a data sensing period, information of a sensor to be activated and the like. If the remaining capacity of the battery is sufficient, the environment monitoring apparatus 110 may sense peripheral environments and may transmit the sensed information to the server 120 through the Wi-Fi AP 130. Or, the environment monitoring apparatus 110 may directly communicate with smart devices or the Wi-Fi AP 130 and may transmit sensed information. The plurality of smart devices may connect to the server 120 which stores the sensed information, and may read the sensed information from the server 120 and may display the sensed information such that the user sees the sensed information. Herein, if the server 120 pushes the sensed information to the smart devices blindly, there is a high possibility that the sensed information will be spam. Accordingly, it is preferable that the server 120 verifies whether there is the same network address in an internet protocol (IP) obtained after connecting to the same Wi-Fi network and pushes sensed information when there is information about the environment monitoring apparatus 110 of the same Wi-Fi network. The reason why the environment monitoring apparatus 110 does not transmit sensed information to the plurality of smart devices directly is for the environment monitoring system to transmit only sensed information unilaterally and then enter a sleep state immediately to operate in a low-power mode. However, the environment monitoring apparatus 110 may transmit sensed information to the plurality of smart devices directly according to a request of a user.

Figure 2:
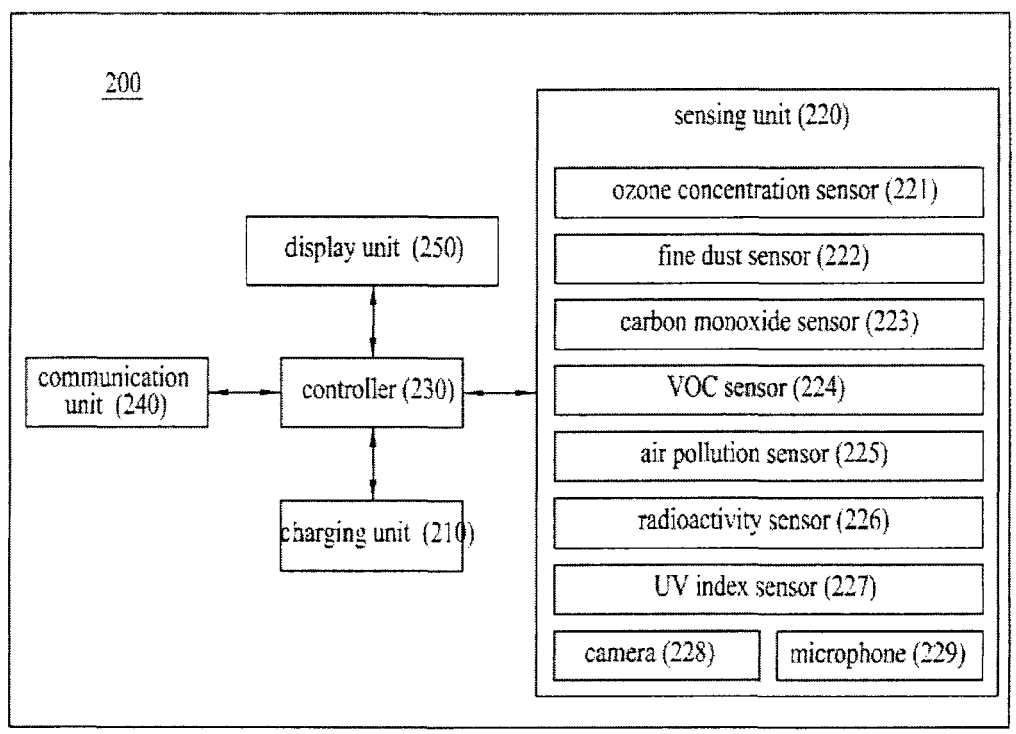
FIG. 2 is a block diagram illustrating a configuration of an environment monitoring apparatus according to an exemplary embodiment of the inventive concept.

FIG. 2 is a block diagram illustrating a configuration of an environment monitoring apparatus according to an exemplary embodiment of the inventive concept. An environment monitoring apparatus 200 may include a charging unit 210, a sensing unit 220, a controller 230, a communication unit 240, and a display unit 250.

The charging unit 210 may charge power necessary for monitoring environments. The charging unit 210 may include an illumination sensor for adjusting a charging mode according to day and night and may include a solar cell panel, a battery, a power management integrated circuit (PMIC) and the like which generate power from the light of the sun. The charging unit 210 may generate and store power during the day from the light of the sun using the illumination sensor and may operate in a low-power mode at night using the stored power.

The sensing unit 220 may receive power from the charging unit 210 and may sense peripheral environments through a plurality of different sensors which may be selected by a request of a user. The sensing unit 220 may include an ozone concentration sensor 221, a fine dust sensor 222, a carbon monoxide sensor 223, a volatile organic compounds (VOC) sensor 224, an air pollution sensor 225, a radioactivity sensor 226, a UV index sensor 227, a camera 228, and a microphone 229. The scope and spirit of the inventive concept may not be limited to the above-described sensors 221 to 229 included in the sensing unit 220. For example, the sensing unit 220 may further include sensors according to environments to be applied.

The controller 230 may control settings of the sensing unit 220 according to the peripheral environments.

The controller 230 may configure the plurality of different sensors of the sensing unit 220 as predetermined sets of the sensors and may select the predetermined sets automatically or manually according to a request of the user.

Also, the controller 230 may reduce power consumption by differently controlling duty cycles of the sensors. In other words, the controller 230 may differently control the duty cycles for reading the sensed information from the sensors according to kinds of the sensors. For example, in case of a gas sensor and an environmental sensor, a heater may be mounted in each of them. This heater may consume a power of about 1 W per sensor. If the heater operates constantly, it is difficult for a solar cell or a battery to cope with the power of about 1 W. Therefore, the controller 230 may control the sensors such that the sensors frequently perform measurement (e.g., one time per 30 minutes) in the daytime when the battery may be charged by the solar cell. Because the environment monitoring apparatus 200 may operate in the night time using only the battery, the controller 230 may control the sensors such that the sensors intermittently perform measurement (e.g., one time per 2 hours). On the other hand, because a temperature sensor and a real time clock (RTC) device consume low power, they may monitor peripheral environments constantly.

The controller 230 may differently control report periods of the sensors according to peripheral environments or a request of the user. For example, the controller 230 may control the UV index sensor 227 such that the UV index sensor 227 is turned or may enhance a sampling rate of the UV index sensor 227 during only the day. The controller 230 may shorten a report period of the air pollution sensor 225 in yellow dust season.

Also, the controller 230 may differently control a sensing period and a transmission period. In other words, the controller 230 may store sensed information in a local memory and may transmit the stored information to a server once. For example, the environment monitoring apparatus 200 may sense peripheral environments according to a predetermined time or purpose and may store the sensed information in the local memory without transmitting it to the server or a peripheral device. The environment monitoring apparatus 200 may prevent unnecessary waste of transmission power by transmitting all of the stored information once. Because sensed information has a very small size actually, much power may be consumed while a wireless transceiver, such as a Wi-Fi device, walks up, establishes a session, and receives an IP.

Also, the user may set a sensing period of the environment monitoring apparatus 200, may select a sensor to be sensed, and may set other environments. For example, if the user wants to directly control the environment monitoring apparatus 200 through his or her smart phone, there is a problem in that the environment monitoring apparatus 200 must be synchronized with the smart phone. To solve this problem, if the user sets up environments to the server through the smart phone or the Internet, the environment monitoring apparatus 200 may wake up time when he or she wakes up, may connect to the server, and may transmit sensed information to the server. At the same time, the environment monitoring apparatus 200 may read environment settings from the server and may change its environment settings.

Also, the controller 230 may select sensors to be activated among the sensors using time information (e.g., an RTC), and may control the sensors using the time information such that the sensors operate at a predetermined time according to a request of the user. For example, the controller 230 may turn off the UV index sensor 227, may shorten a measurement cycle of the UV index sensor 227 in the morning, and may lengthen a measurement cycle of the UV index sensor 227 in the afternoon. Also, the controller 230 may perform a separate setting according to seasons.

Also, the controller 230 may control the sensors using time information so that the sensors sense peripheral environments with only a time zone the user wants. For example, the sensors may sense peripheral environments with rush hour at 7 a.m. every day and may transmit the sensed information to the user such that he or she adjusts his or her address and carries things he or she needs before work. In other words, when sensors sense peripheral environments at 7 a.m. every day, if yellow dust is really bad or if there is rapid difference in temperature compared to the previous day, the controller 230 may provide a warning against this to the user such that he or she prepares himself or herself for the sensed environments.

Also, the controller 230 may separately turn on/off sensors according to current power and charging states, or may select a sensor set as a set for low-power consumption. In other words, a sensing period and a communication period are shorten through environment setups and other setups, if a battery level is lowered to a threshold or less, the controller 230 may maximize the life of the environment monitoring system by shortening the sensing period and the communication period through default settings according to an energy level to perform a low-power operation. For example, it is essential to perform a long-term operation in the rainy season. If energy is not considered, it may be quickly consumed in the rainy season when it is impossible to charge a battery.

The communication unit 240 may transmit information sensed by the sensing unit 220 to the server such that the server shares it with a plurality of smart devices. In other words, the information acquired by sensing peripheral environments may be transmitted to the server through the communication unit 240. The server may receive and store the sensed information from the communication unit 240, and may share the stored information with the plurality of smart devices through a wireless router (e.g., a Wi-Fi AP). Each of the plurality of smart devices may receive the sensed information from the server and may display a notification on the sensed information to the user.

Transmitting the sensed information through a network, the communication unit 240 may perform time synchronization through a Wi-Fi AP or a plurality of smart devices. Because the environment monitoring apparatus 200 according to an exemplary embodiment of the inventive concept maintains time information based on an oscillator, as time passes, errors may be accumulated and time difference may be widened. Accordingly, to correct the time difference, the environment monitoring apparatus 200 may perform time correction whenever the communication unit 240 connects to a network. Also, the environment monitoring apparatus 200 may set synchronization according to a duty cycle determined by the user. The control unit 230 may control sensing settings of the sensing unit 220 according to the synchronized time.

The display unit 250 may display the sensed information to the user, and may display a notification according to the sensed information to the user. For example, the display unit 250 may display the remaining capacity of energy, and may display a warning against the remaining capacity of energy.

If a home network and smart devices are used, the environment monitoring apparatus 200 according to an exemplary embodiment of the inventive concept may communicate with not only a smart phone and the Internet but also other household appliances and may share data with the smart devices. For example, when a DLNA function, that is, a push function is mounted in a corresponding smart device, the user of the corresponding smart device may verify sensed information on a display of the corresponding device, such as a TV or an audio.

Also, when the environment monitoring apparatus 200 in which the camera 228 is installed is installed on a window, the environment monitoring device 200 may be used for security purposes through indoor monitoring. Also, when the environment monitoring apparatus 200 is installed within the house, it may inform the user of time to ventilate indoor air when smoke/harmful gas is generated by sensing indoor environments.

Figure 3A:
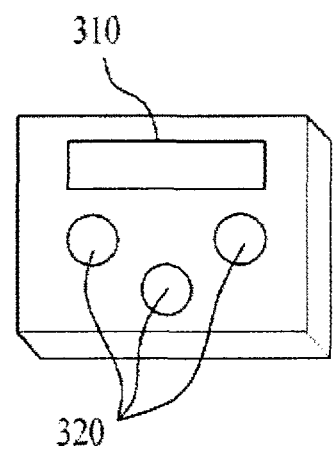
FIGS. 3A and 3B are drawings illustrating the appearance of an environment monitoring apparatus according to an exemplary embodiment of the inventive concept.
Figure 3B:
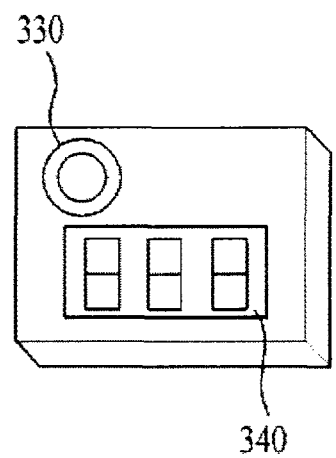

FIGS. 3A and 3B are drawings illustrating the appearance of an environment monitoring apparatus according to an exemplary embodiment of the inventive concept. FIG. 3A illustrates a front surface of the environment monitoring apparatus according to an exemplary embodiment of the inventive concept. A solar cell panel 310 for charging power necessary for monitoring environments may be installed in the front surface of the environment monitoring apparatus. A plurality of different sensors 320 for sensing peripheral environments may be further installed in the front surface of the environment monitoring apparatus. These sensors 320 may be selected and controlled by a request of a user. FIG. 3B illustrates a rear surface of the environment monitoring apparatus according to an exemplary embodiment of the inventive concept. A camera 330 for monitoring the inside of the house may be installed in the rear surface of the environment monitoring apparatus. The rear surface of the environment monitoring apparatus may be attached to glass. Accordingly, the environment monitoring apparatus may monitor indoor environments through the camera 330 of the rear surface. A display unit 340 for displaying information sensed through the sensors 320 to the user and displays a notification according to the sensed information to the user may be further installed in the rear surface of the environment monitoring apparatus.

Figure 4:
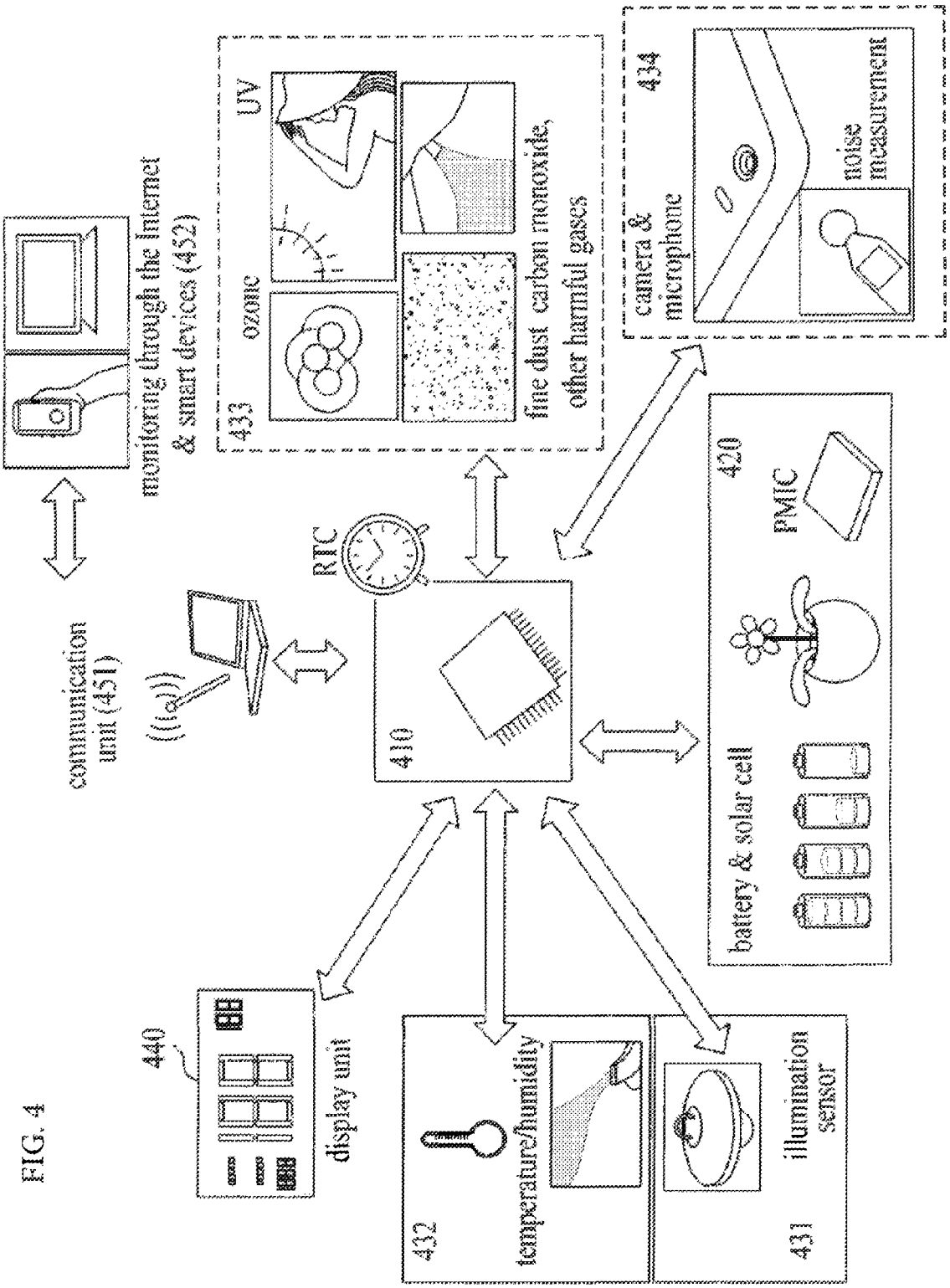
FIG. 4 is a drawing illustrating an operation of an environment monitoring system according to an exemplary embodiment of the inventive concept.

FIG. 4 is a drawing illustrating an operation of an environment monitoring system according to an exemplary embodiment of the inventive concept.

An environment monitoring apparatus 410 may acquire an environmental pollution level and information about environments near a user or his or her house through a plurality of sensors. For example, these sensors may include sensors 432 for measuring temperature and humidity, sensors 433 for measuring ozone concentration, a UV index, fine dust, carbon monoxide, and other harmful gases, a camera & microphone 434 for photographing images and measuring noises, and the like. The scope and spirit of the inventive concept may not be limited to the sensors. For example, these sensors may further include more sensors according to the necessity of a user.

The environment monitoring apparatus 410 may charge necessary power using a battery and solar cell 420 to monitor peripheral environments. A charging unit including this battery and solar cell 420 may include an illumination sensor 431 for adjusting a charging mode according to day and night, and may further include a solar cell panel, a battery, a PMIC and the like for generating power from the light of the sun. The environment monitoring apparatus 410 may generate and store power from the light of the sun during the day using the illumination sensor 431, and may operate in a low-power mode at night using the stored power.

Also, the environment monitoring apparatus 410 may select sensors to be activated among the sensors using time information (e.g., an RTC), and may control the sensors so that the sensors operate in a predetermined time according to a request of the user. For example, the environment monitoring apparatus 410 may turn off a UV index sensor at night, may shorten a measurement cycle of the UV index sensor in the morning, and may lengthen a measurement cycle of the UV index sensor in the afternoon. Also, the environment monitoring apparatus 410 may perform separate setting according to seasons.

The environment monitoring apparatus 410 may sense peripheral environments and may display the sensed information to the user through a display unit 440. Also, the environment monitoring apparatus 410 may transmit the sensed information to a server. The server may receive and store the sensed information from the environment monitoring apparatus 410, and may share the sensed information with smart devices of the user through a communication unit 451, for example, a wireless router (e.g., a Wi-Fi AP) or the Internet. Accordingly, the user may monitor the sensed information using the Internet and the smart devices (452). These smart devices may receive the sensed information from the server through the Wi-Fi AP and the Internet, and may display a notification on the sensed information to the user. Also, if each of the plurality of smart devices enters an area of the Wi-Fi AP, it may display a notification on sensed information to the user automatically through an application previously installed therein. Also, the server or the environment monitoring apparatus 410 may display a notification on sensed information on the smart devices of the user through its push function.

Also, each of the smart devices of the user may connect to the server which shares sensed information therewith through the Internet, and may share the sensed information with the server in the outside. In other words, connecting to an internet server or a cloud and storing sensed information, each of the smart devices may establish an environment information map of the entire country in the long term. Also, each of the smart devices may verify environment sensing data anywhere using location information. For example, when the user will leave for a business trip to convention and exhibition (COEX) in Seoul while living in Daejeon, he or she may ascertain environment sensing information near the COEX in advance in Daejeon and may prepare himself or herself for the environment sensing information.

Figure 5:
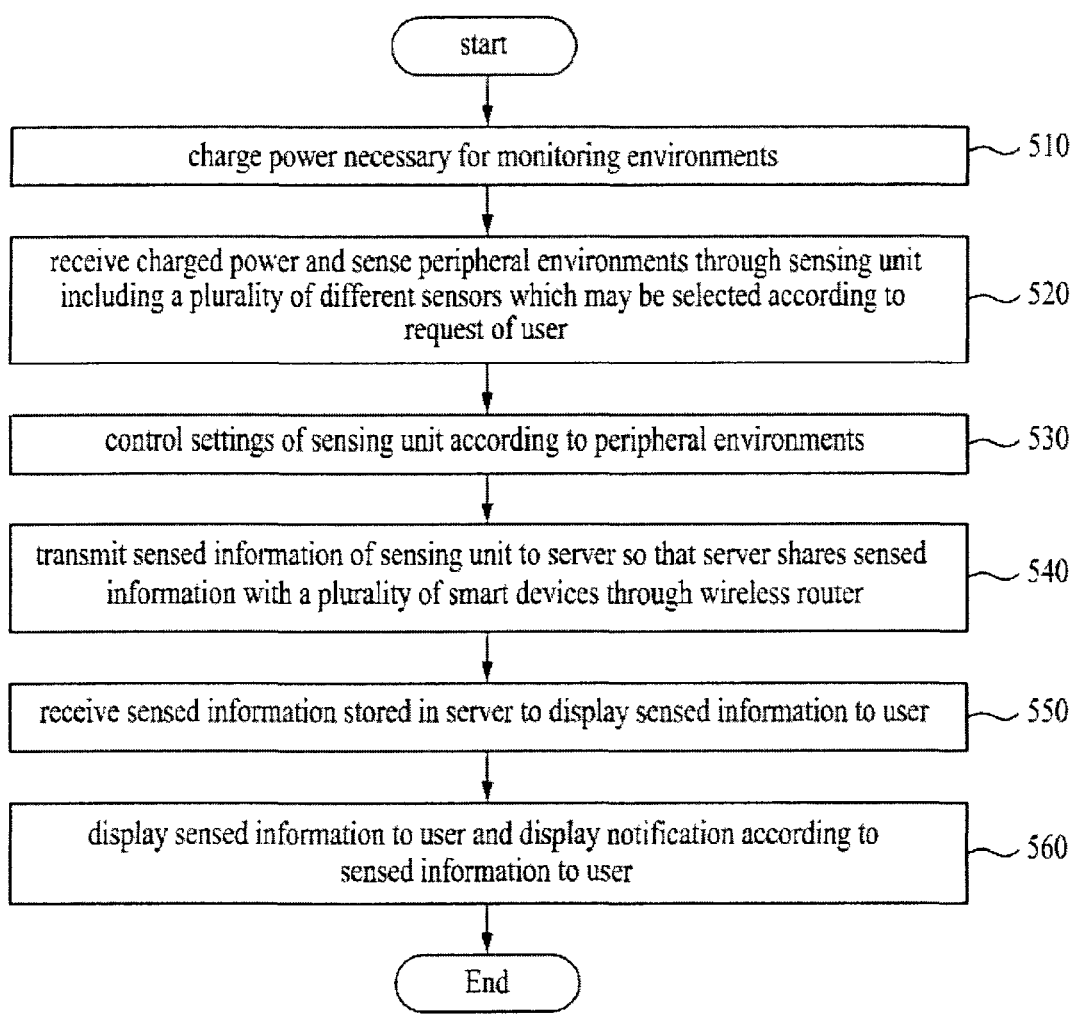
FIG. 5 is a flowchart illustrating an environment monitoring method according to an exemplary embodiment of the inventive concept.

FIG. 5 is a flowchart illustrating an environment monitoring method according to an exemplary embodiment of the inventive concept.

The environment monitoring method may include charging power necessary for monitoring environments in step 510, receiving the charged power and sensing peripheral environments through a sensing unit including a plurality of different sensors which may be selected according to a request of a user in step 520, controlling settings of the sensing unit according to the peripheral environments in step 530, transmitting the sensed information of the sensing unit to a server so that the server shares the sensed information with a plurality of smart devices through a wireless router in step 540, and displaying the sensed information to the user and displaying a notification according to the sensed information to the user in step 550.

In step 510, an environment monitoring apparatus may charge the power necessary for monitoring the environments. The environment monitoring apparatus may charge power through a charging unit which includes an illumination sensor for adjusting a charging mode according to day and night and a solar cell panel, a battery, a PMIC and the like for generating power from the light of the sun. The environment monitoring apparatus may generate and store power from the light of the sun during the day using the illumination sensor, and may operate in a low-power mode at night using the stored power.

In step 520, the environment monitoring apparatus may receive the charged power and may sense the peripheral environments through the sensing unit including the plurality of different sensors which may be selected according to the request of the user.

In step 530, the environment monitoring apparatus may control the settings of the sensing unit according to the peripheral environments. Herein, the environment monitoring apparatus may configure the plurality of different sensors as predetermined sensors, and may select the sensor sets automatically or manually according to a request of the user. Also, the environment monitoring apparatus may reduce power consumption by differently controlling duty cycles of the sensors. The environment monitoring apparatus may differently control report periods of the sensors according to peripheral environments or a request of the user. Also, the environment monitoring apparatus may separately turn on/off the sensors according to current power and charging states and may select a set of the sensors as a set for low-power consumption.

In step 540, the environment monitoring apparatus may transmit the sensed information of the sensing unit to the server so that the server shares the sensed information with the plurality of smart devices through the wireless router. In other words, the environment monitoring apparatus may sense peripheral environments and may transmit the sensed information to the server through a communication unit. The server may receive and store the sensed information from the communication unit, and may share the sensed information with the plurality of smart devices through the wireless router. Each of the plurality of smart devices may receive the sensed information from the server and may display a notification on the sensed information to the user.

In step 550, the environment monitoring apparatus may receive the sensed information stored in the server to display the sensed information to the user.

In step 560, the environment monitoring apparatus may display the sensed information to the user, and may display the notification on the sensed information to the user. For example, the environment monitoring apparatus may display the remaining capacity of energy, and may display a warning against the remaining capacity of energy. Also, each of the smart devices which share the sensed information enters an area of a Wi-Fi AP, it may display a notification on the sensed information to the user automatically through an application previously installed therein.

Also, in case of using an internet server, the environment monitoring apparatus may connect to the internet server in the outside. In other words, connecting to the internet server or a cloud and storing sensed information, each of the smart devices may establish an environment information map of the entire country in the long term.

Also, the environment monitoring apparatus may verify environment sensing data anywhere using location information. For example, when the user will leave for a business trip to COEX in Seoul while living in Daejeon, he or she may ascertain environment sensing information near the COEX in advance in Daejeon and may prepare himself or herself for the environment sensing information.

Therefore, the environment monitoring apparatus according to exemplary embodiments of the inventive concept may adjust the charging mode according to day and night and may perform a low-power operation, and may differently control the report periods of the sensors according to the peripheral environments and the request of the user. Also, environment monitoring apparatus may control the sensors using the time information so that the sensors operate in a predetermined time according to the request of the user. The environment monitoring apparatus may control the sensing settings of the sensing unit according to the synchronized time by performing time synchronization through the Wi-Fi AP or the smart phone when transmitting the sensed information through the network.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Alternatively, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described exemplary embodiments of the inventive concept may be recorded in computer-readable media including program instructions to implement various operations embodied by a computer. The media may also include, alone or in combination with the program instructions, data files, data structures, and the like. The program instructions recorded in the media may be designed and configured specially for the exemplary embodiments of the inventive concept or be known and available to those skilled in computer software. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules to perform the operations of the above-described exemplary embodiments of the inventive concept, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. An environment monitoring apparatus comprising:
a charging unit configured to charge power necessary for monitoring environments;
a sensing unit configured to receive the power from the charging unit and to sense peripheral environments through a plurality of different sensors which are selected according to a request of a user;
a controller configured to control settings of the sensing unit according to the peripheral environments;
a communication unit configured to transmit the sensed information of the sensing unit to a server so that the server shares the sensed information with a plurality of smart devices; and
a display unit configured to display the sensed information to the user and to display a notification according to the sensed information to the user,
wherein the controller selects sensors to be activated among the sensors using time information and controls the sensors so that the sensors operate in a predetermined time according to a request of the user using the time information.

2. The environment monitoring apparatus of claim 1, wherein the charging unit comprises:
an illumination sensor configured to adjust a charging mode according to day and night, and
wherein the charging unit generates and stores power from the light of the sun during the day using the illumination sensor and operates in a low-power mode at night using the stored power.

3. The environment monitoring apparatus of claim 1, wherein the plurality of different sensors comprises an ozone concentration sensor, a fine dust sensor, a carbon monoxide sensor, a volatile organic compounds (VOC) sensor, an air pollution sensor, a radioactivity sensor, a ultraviolet (UV) index sensor, a camera, and a microphone.

4. The environment monitoring apparatus of claim 1, wherein the controller configures the plurality of different sensors as predetermined sets and selects the sets automatically or manually according to a request of the user.

5. The environment monitoring apparatus of claim 1, wherein the controller differently controls duty cycles of the sensors.

6. The environment monitoring apparatus of claim 1, wherein the controller differently controls report periods of the sensors according to the peripheral environments or a request of the user.

7. The environment monitoring apparatus of claim 1, wherein the communication unit performs time synchronization through a wireless-fidelity (Wi-Fi) access point (AP) or a plurality of smart devices when transmitting the sensed information through a network.

8. The environment monitoring apparatus of claim 7, wherein the controller controls sensing settings of the sensing unit according to the synchronized time.

9. The environment monitoring apparatus of claim 1, wherein the controller separately turns on/off the sensors according to current power and charging states or selects a set of the sensors as a set for low-power consumption.

10. An environment monitoring system comprising:
an environment monitoring apparatus configured to sense peripheral environments and to transmit the sensed information to a server;
the server configured to receive and store the sensed information from the environment monitoring apparatus and to share the sensed information through a wireless router and the Internet; and
a plurality of smart devices, each of the smart devices configured to receive the sensed information from the server or the environment monitoring apparatus and to display a notification on the sensed information to a user,
wherein the environment monitoring apparatus comprises:
a sensing unit configured to receive power from a charging unit and to sense peripheral environments through a plurality of different sensors which are selected according to a request of the user; and
a controller selects sensors to be activated among the sensors using time information and controls the sensors so that the sensors operate in a predetermined time according to a request of the user using the time information.

11. The environment monitoring system of claim 10, wherein each of the smart devices automatically displays the notification on the sensed information to the user through an application previously installed in each of the smart devices when each of the smart devices enters an area of a Wi-Fi AP.

12. The environment monitoring system of claim 10, wherein each of the smart devices connects to the server which shares the sensed information with each of the smart devices through the wireless router and the Internet.

13. An environment monitoring method comprising:
charging power necessary for monitoring environments;
receiving the charged power and sensing peripheral environments through a sensing unit including a plurality of different sensors which are selected according to a request of a user;
controlling settings of the sensing unit according to the peripheral environments;
transmitting the sensed information of the sensing unit to a server so that the server shares the sensed information with a plurality of smart devices through a wireless router; and
displaying the sensed information to the user and displaying a notification according to the sensed information to the user,
wherein the controlling comprises:
selecting sensors to be activated among the sensors using time information and controls the sensors so that the sensors operate in a predetermined time according to a request of the user using the time information.

14. The environment monitoring method of claim 13, wherein the controlling of the settings of the sensing unit according to the peripheral environments comprises:
configuring the plurality of different sensors as predetermined sets and selecting the sets automatically or manually according to a request of the user.

15. The environment monitoring method of claim 13, wherein the controlling of the settings of the sensing unit according to the peripheral environments comprises:
differently controlling report periods of the sensors according to the peripheral environments or a request of the user.

16. The environment monitoring method of claim 13, wherein the controlling of the settings of the sensing unit according to the peripheral environments comprises:
separately turning on/off the sensors according to current power and charging states or selecting a set of the sensors as a set for low-power consumption.

* * * * *